March 18, 1924.

A. A. HOLLE

PNEUMATIC TIRE 1,487,384

Filed March 14, 1923    2 Sheets-Sheet 1

INVENTOR
Alexander Albert Holle.
per Robert E Phillips
Attorney

March 18, 1924.

A. A. HOLLE 1,487,384

PNEUMATIC TIRE

Filed March 14, 1923

2 Sheets-Sheet 2

Patented Mar. 18, 1924.

1,487,384

UNITED STATES PATENT OFFICE.

ALEXANDER ALBERT HOLLE, OF PADDINGTON, LONDON, ENGLAND.

PNEUMATIC TIRE.

Application filed March 14, 1923. Serial No. 625,097.

*To all whom it may concern:*

Be it known that I, ALEXANDER ALBERT HOLLE, a subject of the Queen of the Netherlands, residing at 60 Oxford Terrace, Paddington, in the administrative county of London, England, have invented a new and useful Improvement in Pneumatic Tires, of which the following is a full and complete specification.

This invention relates to pneumatic tires and has for its object a construction which will enable the tire to fulfill its function and stand up to its work with a relatively low air pressure. A further object of the invention is to prevent creeping of the cover and/or the air tube either relative to one another or to the wheel rim on which the tire is mounted.

It is now realized that the high pressure at which pneumatic tires have hitherto been inflated does not make either for maximum comfort or four maximum protection of the vehicle from damage or deterioration arising from road shocks or vibration, and that the necessity for high pressure in the past has arisen entirely from the form of construction and the method of attachment of the present type of pneumatic tire.

I attain the objects of the invention by the construction hereinafter particularly described, shown in the accompanying drawing and specified in the appended claims.

Figure 1:
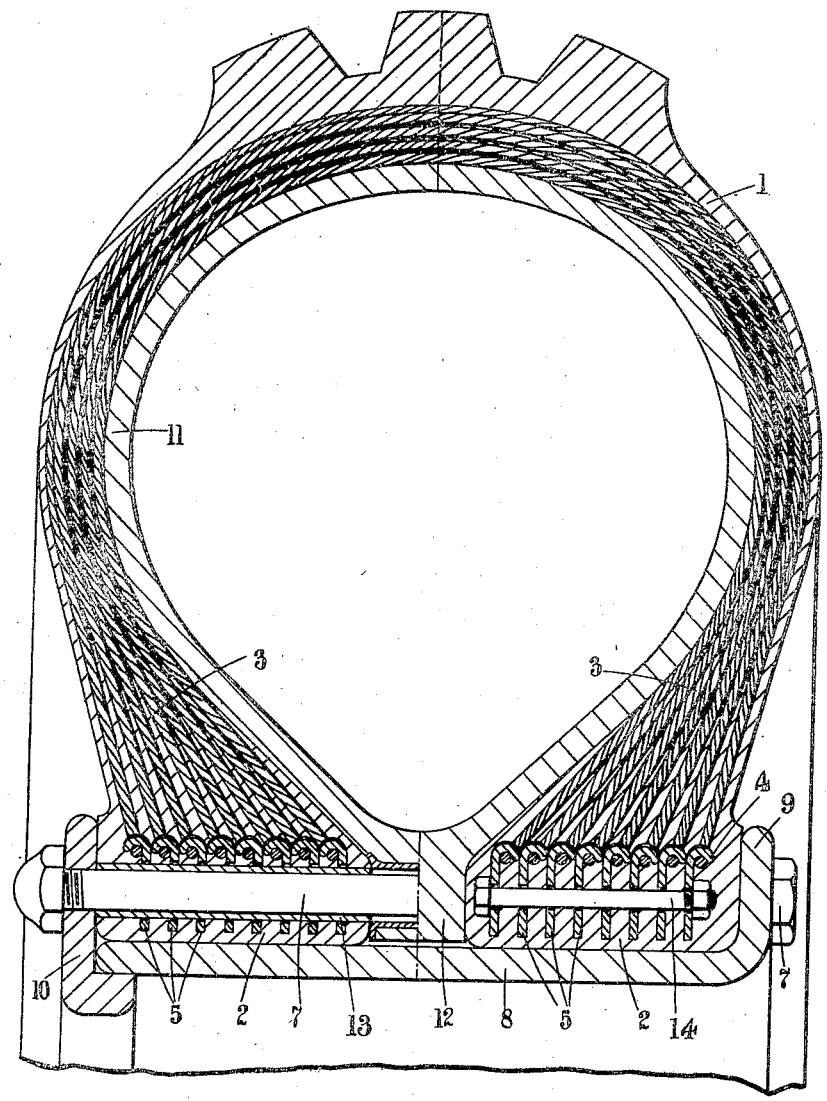
Figure 2:
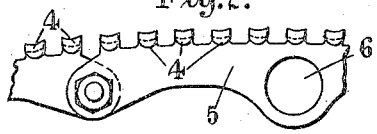
Figure 3:
Figure 4:
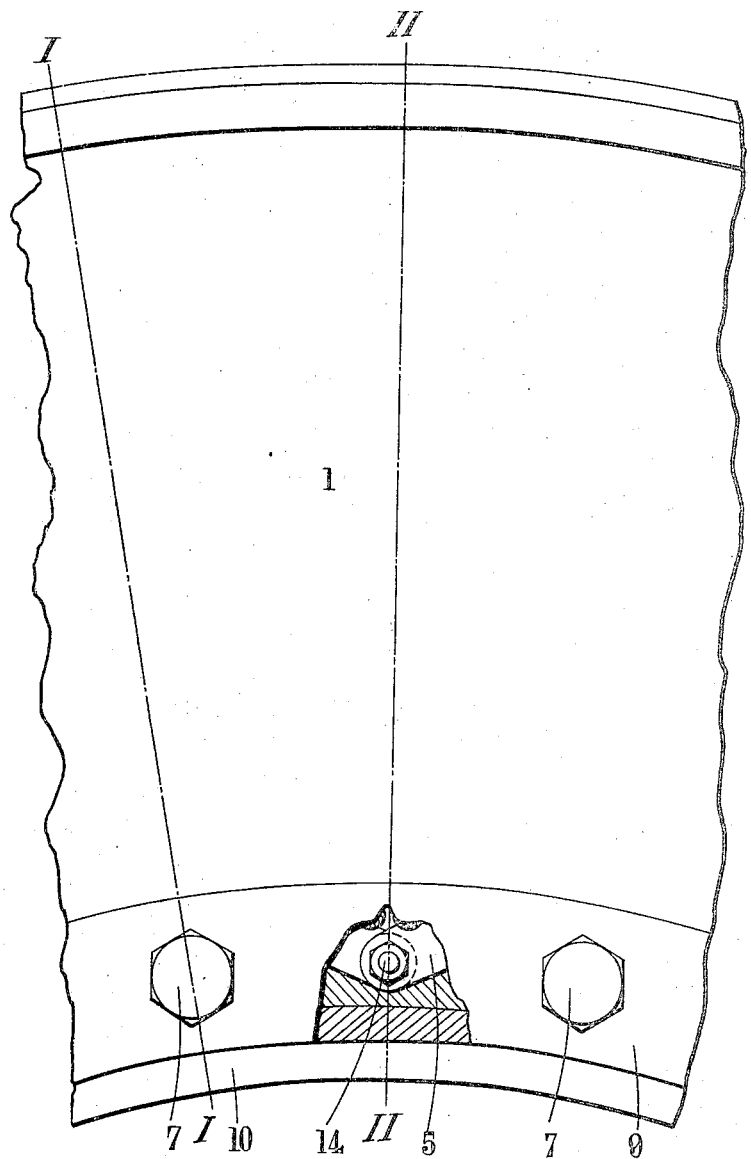

In the accompanying drawing Fig. 1 is a view in transverse section of the complete tire and wheel rim, the left hand half of which is a section on line I, I Fig. 4 showing one part of the construction of the tire and the right hand half which is a section on line II, II Fig. 4 showing another part of the construction of the tire, Fig. 2 is a broken view in side elevation of one of the circular bands for the enlarged edges forming the feet of the cover, and Fig. 3 is a similar view of an alternative form of band.

Throughout the views similar parts are marked with like numerals of reference.

The cover 1 of the tire is made of the well-known straight-sided shape used with two-part wheel rims and its edges are so shaped as to form flat bottomed feet 2 and 2. Said cover is reinforced by layers of cord 3 in the manner well-known in so called "cord" tires the loops of the cord of each layer at each of the edges or feet of the cover being arranged in successive transversely arranged rows which are distributed throughout the width of said edges or feet. The loops of the cord at each edge or foot of the cover engage projections 4 carried by a plurality of hoops 5 which are arranged side by side in said feet or edges and are provided with a series of holes 6 for the fixing bolts 7 to engage with. The rim 8 for carrying the tire is flat with a fixed flange 9 at one edge and a detachable flange 10 at the other edge. The cover is secured to the wheel rim by the transversely arranged bolts 7 which pass through both the flanges 9 and 10 of the wheel rim and through the feet 2 forming the edges of the cover engaging the hoops 5 by the holes 6 therein so that said bolts also provide for the securing of the detachable flange to the main part of the wheel rim.

On the air tube 11 which is of the usual construction and provided with the usual inflation valve is an inwardly arranged radial flange 12 which is adapted to lie between the inner faces of the two feet 2 and 2 of the cover said flange being provided with a plurality of holes for the transverse bolts 7 to pass through thus securing the air tube against creeping.

It will thus be seen that the transverse bolts perform three functions, viz. to secure the cover to the wheel rim, to secure the detachable flange to the wheel rim, and to prevent both the cover and the air tube from creeping on the wheel rim.

The hoops 5 which may be either of ribbon form as shown in Figs. 1 and 2 or of wire as shown in Fig. 3 may for convenience in building up the cover be made in segments in which case either the bolts 7 or auxiliary bolts are utilized to couple the adjacent segments together. When the hoops 5 are made of wire they are looped to provide a plurality of eyes 6 for the bolts 7 to pass through as shown in Fig. 3. This construction also enables the bands to be made up of a plurality of segments.

The hoops 5 may be held in position during the building up of the cover either by a plurality of sleeves 13 passing through the holes 6 in said hoops and through which the bolts 7 will pass, or by means of bolts 14 as shown in the right hand side of Fig. 1.

What I claim is:—

1. A pneumatic tire comprising a cover having enlarged edges and the reinforcing fabric of which comprises a plurality of layers of cord which engage anchorages in the enlarged edges of the cover, a series of hoops located side by side in each of the feet of the cover and distributed through the width of same said hoops being adapted to form anchorages for the cord forming the reinforcing fabric of the cover, a rim comprising a flat main part a fixed flange at one edge of said part and a detachable flange at the other edge of said part, an air tube having a radial flange on its inner circumference, and a plurality of transverse bolts passing through the flanges of the rim, the feet of the arch-shaped cover and the hoops in same and the radial flange of the air tube.

2. A pneumatic tire comprising an arch-shaped cover having enlarged edges shaped to form feet the reinforcing fabric of which consists of a plurality of layers of cord wound over the arch of the cover and around anchorages in the feet of the cover, a plurality of hoops each made up of a series of segments said hoops being located side by side in each of the feet of the cover and adapted to form anchorages for the loops of the cords forming the reinforcing fabric, a rim comprising a flat main part having a fixed flange at one edge and a detachable flange at the other edge, an air tube having a radial flange on its inner circumference, and a plurality of transverse bolts passing through the flanges of the rim, the feet of the arch-shaped cover and the radial flange of the air tube said bolts being also employed to connect together the segments of each of the hoops in the feet of the cover.

3. A pneumatic tire comprising a cover the reinforcing fabric of which comprises a plurality of layers of cord fabric the edges of which engage anchorages in the edges of the cover, a series of hoops located side by side in each of the edges of the cover and distributed through the width of same said hoops being made up of a plurality of segments and each carrying a plurality of projections forming anchorages for the cords forming the reinforcing fabric, a rim comprising a flat main part having a fixed flange at one edge and a detachable flange at the other edge, an air tube having a radial flange on its inner circumference adapted to fit between the edges of the cover, and a plurality of transverse bolts passing through the flanges of the rim the hoops in the edges of the cover and the radial flange of the air tube.

ALEXANDER ALBERT HOLLE.